United States Patent [19]

Summers et al.

[11] 4,275,310

[45] Jun. 23, 1981

[54] PEAK POWER GENERATION

[76] Inventors: William A. Summers, 1015 Melbrook Dr., Munster, Ind. 46321; Robert L. Longardner, 5321 Radnor Rd., Indianapolis, Ind. 46226

[21] Appl. No.: 125,239

[22] Filed: Feb. 27, 1980

[51] Int. Cl.³ .......................... F02C 1/00; F28D 19/00
[52] U.S. Cl. ................................... 290/1 R; 60/39.12; 60/652; 60/659
[58] Field of Search ................ 290/52, 54, 2; 60/398, 60/650, 652, 659, 682, 39.02, 39.12, 39.05

[56] References Cited

U.S. PATENT DOCUMENTS

| 3,523,192 | 8/1970 | Lang | 290/52 |
|---|---|---|---|
| 3,831,373 | 8/1974 | Flynt | 290/52 |
| 3,868,817 | 3/1975 | Marion et al. | 60/39.12 |
| 3,939,356 | 2/1976 | Loane | 290/54 |
| 3,988,897 | 11/1976 | Strub | 60/398 |
| 4,150,547 | 4/1977 | Hobson | 60/659 |

FOREIGN PATENT DOCUMENTS 2000229  4/1979  United Kingdom .................. 60/652

Primary Examiner—J. V. Truhe
Assistant Examiner—Donald L. Rebsch
Attorney, Agent, or Firm—Philip Hill

[57] ABSTRACT

Electric power is provided during periods of peak demand, employing a turbine generator facility activated by the expansion of compressed air, withdrawn from an underground air storage reservoir, in a substantially isothermal system. A generator system, which may comprise a steam boiler or a fuel gasifier, is employed for isothermal compression of air into reservoir storage during periods of low power demand.

10 Claims, 3 Drawing Figures

PEAK POWER GENERATION

BACKGROUND OF THE INVENTION

This invention relates to an improved process for the provision of electric power during periods of peak demand therefor. Although electric power is utilized in diverse ways in the economy and demand remains high at all times, the demand for electric power nevertheless fluctuates markedly during the course of a day. Business demand is high throughout daylight hours in the operation of stores and offices but diminishes significantly thereafter. Residential demand is highest in the evening hours. Industrial demand is relatively steady and high at all times. Other demands, such as for urban transportation, peak at differing times. In an optimized power utilization system all such demands would be complementary and thus provide a substantially constant power requirement which could be served readily by the various sources of electric power in a readily predictable manner.

The uneven demand for electric power requires that power generation capacity be sufficiently great to accommodate the maximum instantaneous demand. This, in turn, leads to uneconomic operation of generally over-sized electric power generation facilities. One approach to this problem has been the encouragement of off-peak usage of electric power in an effort to restructure the demand pattern. Another approach has been the installation of additional generating facilities intended for use during the periods of peak power demand.

An attractive installation of peak power generation facilities generally will be based on the prior storing of energy in a form readily convertible to electrical energy when the need therefor arises. For example, water may be pumped to elevated storage areas for subsequent generation of hydroelectric power. Similarly, air may be compressed and stored against its need in turbo-generation of electric power. Such storage of energy is effected by the consumption of power during off-peak demand periods so that the costs of such storage are substantial.

An attractive means for storing energy in the form of compressed air involves storage in underground reservoirs. Such reservoirs are available wherever a geological formation provides a caprock impermeable to gas, a rock dome therebelow, and artesian water filling the voids in an intermediate aquifer formation. Other suitable reservoirs exist in minedout areas, particularly areas where coal or salt has been removed. Introduction of a compressed gas, such as air, is accommodated by the displacement of the water which still provides a seal effective at the hydrostatic pressure prevailing in the particular formation. Such formations and their use in electric power generation are described, for example, in U.S. Pat. No. 3,523,192.

The cited patent describes a system for employing line power to compress air which is then piped to underground storage. Upon demand, compressed air is withdrawn from storage and sent through a turbine generator to generate needed line power. All operations are essentially adiabatic.

There exists a continuing need for more economic and technologically improved methods for providing electric power in response to the demand for such power during periods of maximum demand.

SUMMARY OF THE INVENTION

This invention generally provides a process for the generation of electric power, particularly during periods of peak power demand, employing a fuel-powered generation facility, turbine expander means, and an associated underground air storage reservoir, comprising the steps of:

(a) compressing ambient air, by passage through at least one compressor stage, to a pressure greater than that maintained in the air storage reservoir, the compressor system of at least one compressor stage being driven at least in part by engagement with at least one turbine expander powered by a hot gas mixture;

(b) cooling the compressed air to substantially ambient temperature by heat exchange with air and water feed streams to the fuel-powered generation facility;

(c) injecting the cooled, compressed air into the underground air storage reservoir through a first well system in communication therewith;

(d) withdrawing stored, compressed air from the underground air storage reservoir through a second well system, responsive to a peak power demand;

(e) heating the withdrawn compressed air by heat exchange or combustion with hot gases from the fuel-powered generation facility;

(f) generating electric power by passing the heated, compressed air and associated hot gases through at least one turbine expander in engagement with an electric power generation means;

(g) discharging the expanded air and any associated gases to the atmosphere at substantially ambient temperature and pressure; and (h) delivering the generated electric power to a power supply system.

The fuel-powered generator system comprises a steam boiler system or a fuel gasifier system, the former heating the compressed air by indirect or, preferably, direct heat exchange and the latter heating the air by combustion of synthetic gases in admixture therewith. The entire operation above ground is maintained substantially isothermal throughout by effective conservation of heat, thus avoiding significant ecological damage to the underground air storage reservoir.

In the embodiments of this invention employing moderate degrees of air compression only rotary, or centrifugal compressors are required. When higher degrees of compression are desired it will usually be necessary to employ a plurality of compressor stages, the higher pressures being achieved with reciprocating compressor systems.

DESCRIPTION OF THE DRAWINGS

The attached drawings are illustrative, without limitation, of this invention.

DETAILED DESCRIPTION OF THE DRAWINGS

Figure 1:
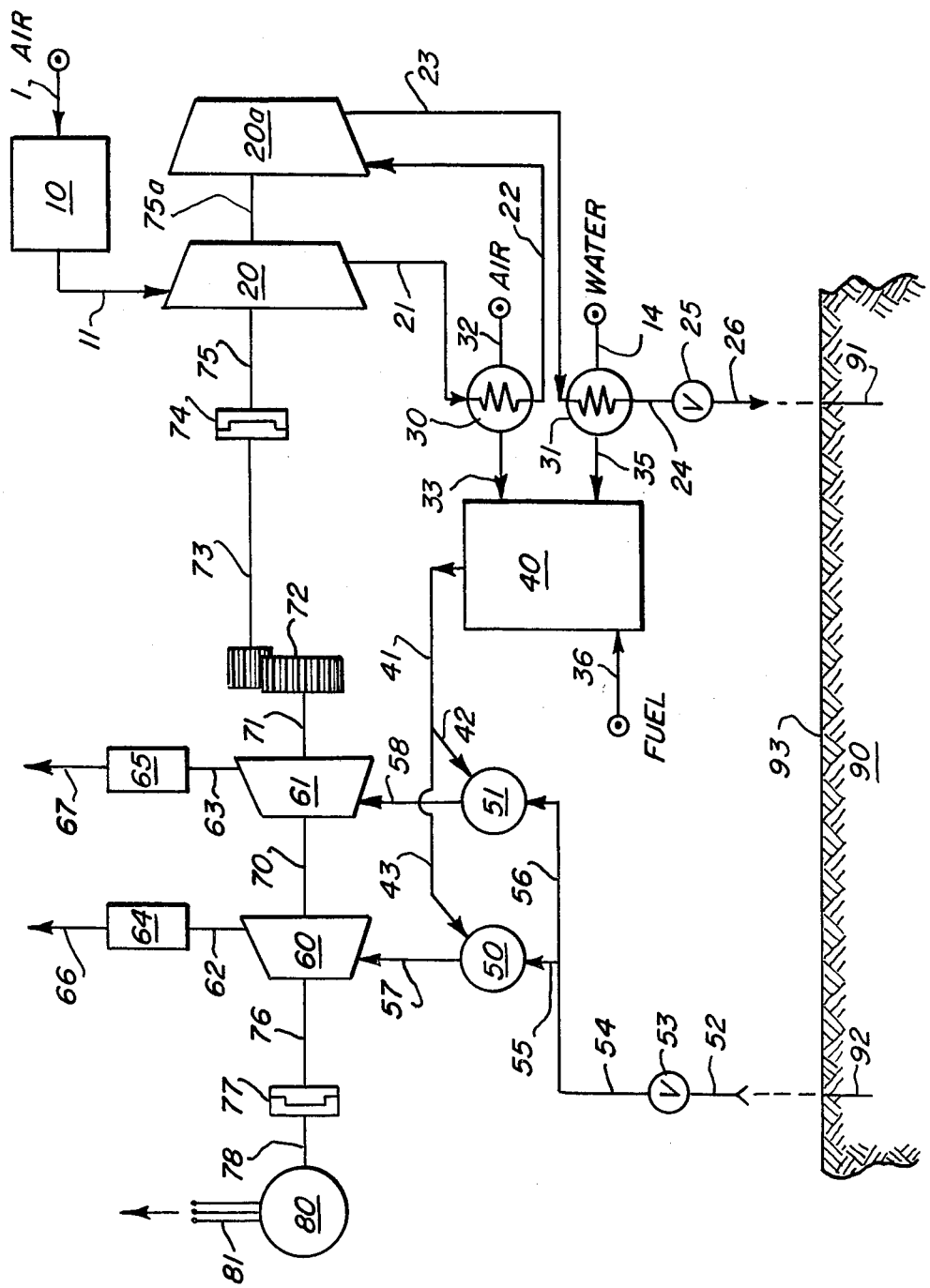
FIG. 1 represents a particular embodiment of process equipment and storage facilities when employing a steam boiler in the fuel-powered generator system.

With reference to the embodiment shown schematically in FIG. 1, atmospheric air is drawn through line 1, filter 10, and line 11 into air compressor 20. Partially compressed air is passed through line 21, heat exchanger 30 for cooling opposed to ambient air entering through line 32, and line 22 into air compressor 20a. Fully compressed air is then passed through line 23, heat exchanger 31 for cooling to ambient temperature opposed to water entering through line 34, line 24, pressure valve 25, and line 26 into injection well 91, extending below ground surface 93 into reservoir structure 90.

Air and water, after warming by heat exchange as set forth above, enter steam boiler 40 through respective lines 33 and 35. Fuel for the boiler is fed through line 36. Generated steam is provided through lines 41, 42, and 43 to downstream facilities.

During air compression periods, steam is passed directly through heat exchanger vessels 50 and 51 and respective lines 57 and 58 to turbine expanders 60 and 61. The expanders rotatably engage, through axles 70 and 71, with gears 72 to drive line assembly 73, clutch 74, and line assemblies 75 and 75a which are respectively coupled to compressors 20 and 20a. If desired, the expanders may be operated as separate stages, not shown.

During electric power generation periods the compression assemblies are disengaged and steam is similarly passed through the turbine expanders, now rotatably engaged through axles 70 and 76 with clutch 77 and line assembly 78 to electric power generator 80. Three-phase electric power is passed to a convenient transmission system through power line 81.

During peak electric power generation periods, compressed air is drawn from reservoir structure 90 through well 92, line 52, valve 53 and lines 54, 55, and 56 to respective heat exchanger vessels 50 and 51. Steam mixes with and heats the compressed air in exchanger vessels 50 and 51 and the hot gaseous mixture passes through lines 57 and 58 into respective turbine expanders 60 and 61. In a separate embodiment, not shown, where steam is employed in indirect heat exchange with air in vessels 50 and 51, steam and heated air are passed to separate turbine expanders for use in electric power generation.

During all operational periods, exhaust air is passed through respective trains represented by lines 62 and 63, exchangers 64 and 65, silencers, not shown, and lines 66 and 67 to the atmosphere. The exhaust air enters the atmosphere at ambient temperature and steam condensate is conventionally collected and returned to steam boiler 40 by means not shown. In all cases where steam is passed through an expander, final cooling of steam to provide condensate occurs in exchangers 64 and 65, thus avoiding imbalance and corrosion in the turbine expanders.

Figure 2:
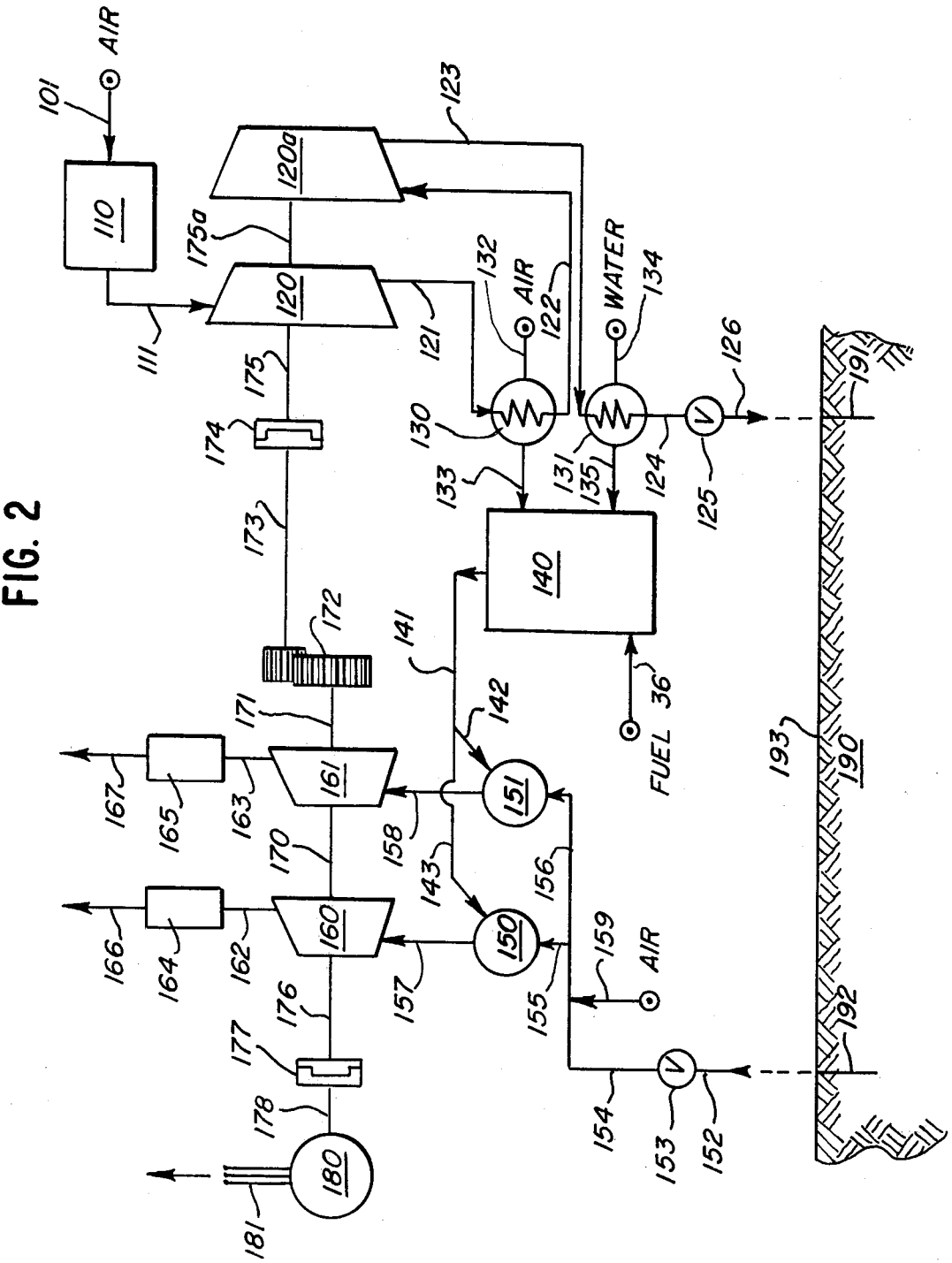
FIG. 2 represents a similar arrangement adapted to the use of a gasifier in the fuel-powered generator system.

With reference to the system shown schematically in FIG. 2, atmospheric air is drawn through line 101, filter 110, and line 111 into air compressor 120. Partially compressed air is passed through line 121, heat exchanger 130 for cooling opposed to ambient air entering through line 132, and line 122 into air compressor 120a. Fully compressed air is then passed through line 123, heat exchanger 131 for cooling to ambient temperature opposed to water entering through line 134, line 124, pressure valve 125, and line 126 into injection well 191, extending below ground surface 193 into reservoir structure 190.

Air and water, after warming by heat exchange as set forth above, enter fuel gasifier 140 through respective lines 133 and 135. Fuel for the gasifier is fed through line 136. Generated synthesis gas is provided through lines 141, 142, and 143 to downstream facilities.

During air compression periods, synthesis gas is passed directly through combustors 150 and 151, for combustion with air entering through lines 159, 155 and 156, and respective lines 157 and 158 to turbine expanders 160 and 161. The expanders rotatably engage, through axles 170 and 171, with gears 172 to drive line assembly 173, clutch 174, and line assemblies 175 and 175a which are respectively coupled to compressors 120 and 120a.

During electric power generation periods the compression assemblies are disengaged and combustion gas is similarly passed through the turbine expanders, now rotatably engaged through axles 170 and 176 with clutch 177 and line assembly 178 to electric power generator 180. Three-phase electric power is passed to a convenient transmission system through power line 181.

During peak electric power generation periods, compressed air is drawn from reservoir structure 190 through well 192, line 152, valve 153 and lines 154, 155, and 156 to respective combustors 150 and 151. Compressed air mixes with the synthesis gas and combustion occurs in combustors 150 and 151. The hot gaseous mixture passes through lines 157 and 158 into respective turbine expanders 160 and 161.

During all operational periods, exhaust air is passed through respective trains represented by lines 162 and 163, exchangers 164 and 165, silencers, not shown, and lines 166 and 167 to the atmosphere. The exhaust combustion gases enter the atmosphere at substantially ambient temperature.

Figure 3:
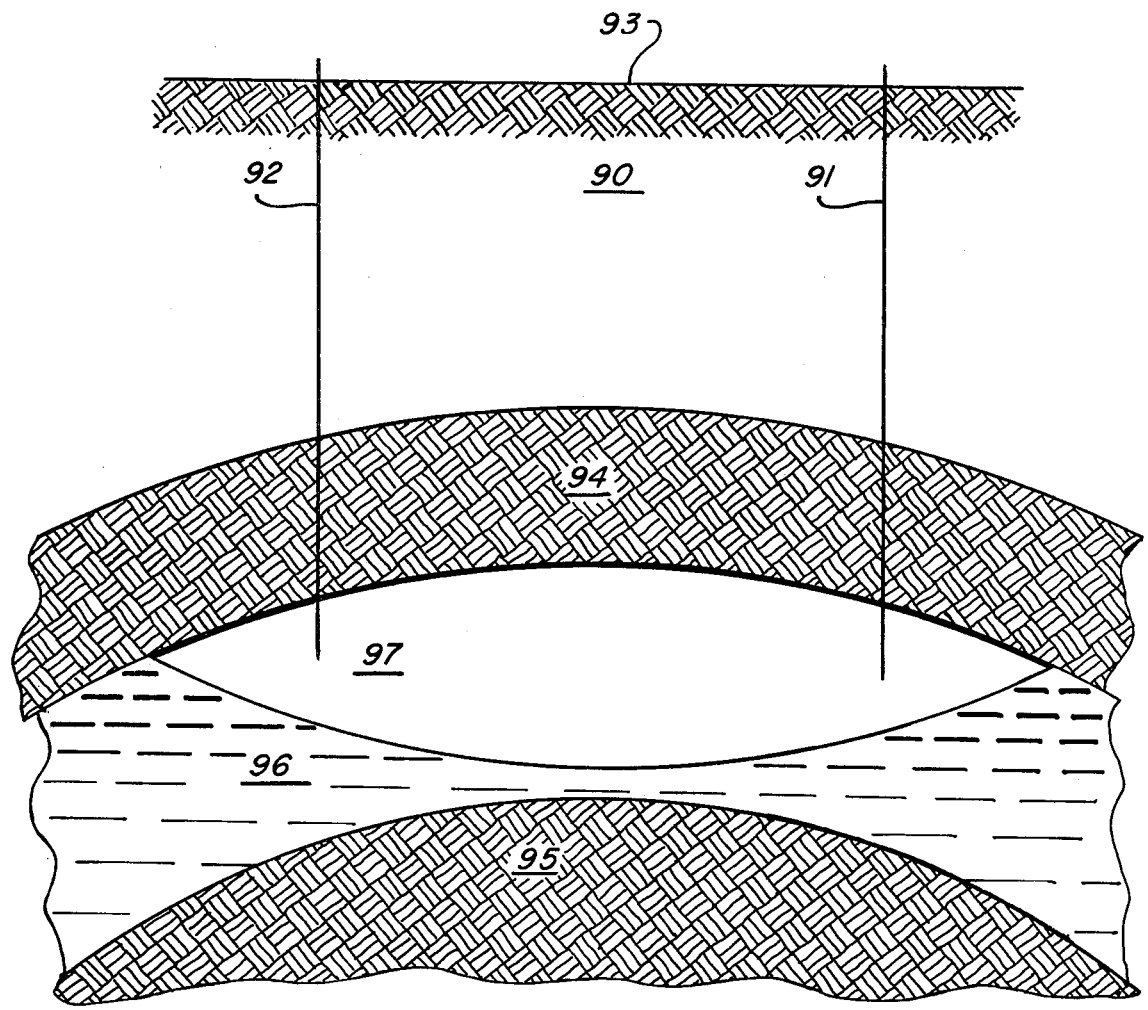
FIG. 3 provides a simplified cross-sectional view of an air storage reservoir formation.

With reference to the air storage reservoir formation, shown in simplified cross-sectional view in FIG. 3, a suitable reservoir structure 90 includes a dome formation 95 and a caprock structure 94, both located a substantial distance below the ground surface 93. Intermediate the dome and caprock structures lies a water-bearing stratum 96 wherein water may be displaced by air, entering through injection well 91 under sufficient pressure to overcome the natural hydrostatic pressure prevailing in the stratum 96. The dome feature effectively sealably traps the compressed air 97 within the stratum 96 so that it may be withdrawn upon demand through withdrawal well 92. A cushioning of the natural hydrostatic pressure and the volume of air that may be stored is limited only by the physical dimensions of the geological structure and the magnitude of the hydrostatic pressure.

DESCRIPTION OF THE INVENTION

This invention relates to the provision of electric power, during periods of peak demand for such power, employing a turbine system, activated principally by the use of compressed air from an underground air storage reservoir, in a substntially isothermal system. Gas compression is effected by a fuel-powered generator system. Exemplary of such a fuel-powered generator system is a steam generation facility. Equally suitable is a generator adapted to operation in conjunction with a fuel-gasification facility, particularly a coal-gasification facility. The power generator system may comprise any turbine expander system suitable for use with hot gases. Similarly, any steam or gasifier facility may be employed, conditioned upon its adaptability to the site selected for the power generation process.

In the practice of this invention, filtered ambient air is compressed, by passage through one or more compression stages, from atmospheric pressure up to a pressure exceeding the hydrostatic pressure of the aquifer air storage reservoir. Such compression may require one, two, or several stages. Heat evolved as a consequence of the compression is removed from the air stream in indirect heat exchange with air and water feed streams to a fuel-powered system such as, for example, a steam boiler. Moisture condensed from the compressed air upon cooling may be removed after any or all of the heat exchange steps and incorporated in the water feed to the fuel-powered system. The compressors employed herein are powered by engagement, at least in part, with turbine expanders associated with the fuel-powered system.

The compressed air stream, at approximately atmospheric temperature, is then introduced by passage through an injection well system into the aquifer zone of an underground storage reservoir, having a suitable porosity to accomodate the requisite quantity of compressed air. In a typical installation employing this invention, from about 500 million to about 2 billion cubic feet, preferably from about 600 million to about 1 billion cubic feet, of air (S.T.P.) may be employed daily. In order to maintain the reservoir pressure substantially constant, a gas cushion of substantially ten times this quantity will usually be required. Suitable reservoir pressures may generally range from about 200 to about 2,500 p.s.i.a., preferably from about 250 to about 500 p.s.i.a. Generally, the aquifer may possess a porosity within the range from about 5 to about 40 percent when limestone formations are employed, and from about 5 to about 20 percent when employing a granular sand formation.

The injection air must be compressed to a pressure greater than the natural hydrostatic pressure prevailing in the storage reservoir. In general, the gas from the final compressor stage should be at a pressure of up to about 110% of the natural hydrostatic pressure. Where this pressure does not exceed about 350 p.s.i.a., the compression of the air may be effected completely with rotary, or turbine, compressors. At higher storage pressures it may be necessary to employ reciprocating compressors, driven by the fuel-powered system, in the latter compression stages. The number of compression stages will be selected such that the heat of compression may be readily recovered from the air stream without experiencing excessive temperature gradients.

In a preferred embodiment of this invention the electric power generator is located in close proximity to the reservoir site. However, compressed air may be piped to whatever distance is required by existing surface irregularities or usages.

The steam generator system may be fired with any suitable fuel, although a preferred fuel is coal. In an optimized situation the entire process of this invention may be practiced in proximity to the fuel source such as, for example, a subterranean coal mine or a strip mine. Such a power system will be employed substantially constantly, either in driving air compressors or in generating electric power.

The fuel-powered system is intended to run at an optimum power generation level at all times, for example, within the range from about 80% to about 90% or more of rated power capacity. During some twelve to sixteen hours of a typical commercial day, the power system will be employed in air compression. During the remainder of the day, when electric power demand is greater, the power system will be employed in electric power generation by disengaging the compressors from the turbine expanders and engaging therewith a generator for three-phase electric power. The turbine expander load is augmented during periods of peak demand by bringing compressed air from storage so that peak electric power generation is realized. On weekends or holidays, when no peak demand materializes, the power system may be employed solely in air compression.

When there is need for generation of peak power, compressed air is withdrawn, as through a second well system from the reservoir, filtered and heated in a manner dictated by the particular steam generation or fuel gasification facility employed. Although the compressed air is substantially dry as injected into aquifer storage, the withdrawn air may approach saturation with moisture. Such saturation can be beneficial to the practice of this process.

When employing a steam generation facility, the withdrawn compressed air may be heated indirectly with steam, or may preferably be mixed directly with steam in a suitable mixing zone. The hot steam and air, or steam-air mixture, at a temperature of from about 300° to about 1,000° F., preferably from about 450° to about 950° F., is then passed into at least one turbine expander. With expansion, whether in one or a plurality of stages, the gas mixture is cooled so that the air is discharged at substantially ambient conditions. Steam is brought close to the dew point during expansion, passed finally through a heat exchanger, and steam condensate is collected and recycled to the steam generation facility. During peaking periods each turbine expander engages an electric power generator from which generated three-phase power is fed to an adjacent electric transmission system.

When employing a fuel gasification facility the withdrawn compressed air is introduced into a combustion zone together with the gasifier effluent to provide a hot gas combustion mixture at a temperature within the range from about 600° to about 1,000° F., preferably from about 800° to about 950° F. The hot gases are then passed into the turbine expander system now in engagement with the electric power generator, and the expanded, cooled gases are discharged to the atmosphere at substantially ambient conditions.

In the practice of this invention, heat energy is remarkably conserved by recovery of heat from air in the compression step together with maximization of conventional heat conservation and waste heat recovery as practiced in typical steam or gasification plants. Particularly significant economies are effected by the substantially isothermal operation of air compression and air expansion steps. Another major benefit of isothermal operation lies in the minimal effect on the ecology. Air is taken from the atmosphere at ambient temperature and is eventually returned under substantially the same conditions. Although the temperature prevailing in underground storage reservoirs may differ somewhat from that at the surface, the difference will usually not be great. Accordingly, the injection of compressed air under such conditions will not create a significant temperature differential and certainly will not have the seriously unsettling effects of the continuous pumping of hot compressed air which can in short order upset temperature, salt solubility and other equilibria. Similarly, the injection of compressed air at ambient temperature minimizes the possibility of spontaneous combustion of any organic matter present in the reservoir.

In the expansion step the compressed air is filtered and heated, either by steam or by combustion of synthetic gases in admixture therewith, sufficiently to compensate for the heat absorbed during expansion so that an optimized energy conversion, whether as expanded air or gas or as electric power, prevails.

When employing a steam boiler system, the injection of air into the storage reservoir and withdrawal of air therefrom may be effected with only one well sunk into the reservoir formation. Although this economy may also be practiced when power is provided by a fuel gasifier system, this latter system may desirably dictate the bleeding of some compressed air into the gasifier unit during periods normally reserved for air compression. This latter operation would require a separate withdrawal well.

In general, the use of a separate withdrawal well system, at some distance from the injection well system, is preferred as a means for withdrawal of compressed air more closely approaching equilibration in moisture content due to more prolonged storage in the artesian environment.

The fuel-powered generator, whether a steam boiler or a fuel gasifier, is sized to provide the necessary compression work load as well as at least the work load for heating compressed air during the electric power generation cycle. In practice, additional work load will usually be available during the peak power demand cycle to further augment the power generation. Because the compression cycle will often occupy at least about sixteen hours of a day, so that electric power generation is often confined to a period of no more than about eight hours per day, the compressor may be of a smaller capacity than would otherwise be required. The presence of the fuel-powered system, as a part of the air compression-expansion system, greatly enhances the energy efficiency of the system and minimizes both the capital cost and operating costs for peak power generation.

Exemplary of this invention, ambient air at 75° F. and 14.7 p.s.i.a. is filtered and passed into a first notary compression stage where it is compressed to 73 p.s.i.a. while the liberated heat of expansion raises the temperature of the exhaust gas to 310° F. The exhaust, compressed air is cooled back to 75° F. by heat exchange with air and passed into a second compression stage. Exhaust gas from this second stage, at 330 p.s.i.a. and 310° F., is cooled to ambient temperature by heat exchange with water and sent to underground storage where aquifer pressure is maintained substantially constant at about 315 p.s.i.a.

Heat recovery in the intercooling and aftercooling heat exchangers conserves at least about 10 percent of the total compression work load and re-uses this energy either in further compression or in heating air prior to subsequent expansion.

During the peak power demand cycle, compressed air is withdrawn from the storage reservoir at about 305 p.s.i.a., preheated to 300° F. and passed into a first expansion stage where the pressure is dropped to 70 p.s.i.a. Subsequently the air is reheated to 300° F. and finally expanded. Where sufficient steam is present in the gas stream the second expansion is effected so that exhaust gas leaves the expander at substantially ambient pressure and at about 225° F. Final heat exchange with incoming air and/or water drops the condensate temperature to 75° F. for return to the system.

When compressing approximately 1 million cubic feet of air (S.T.P.) per minute, the daily quantity compressed, on a sixteen-hour compression cycle, will be 960 million cubic feet of ambient air. When expanding this quantity of air in an eight-hour peak power generation cycle, 2 million cubic feet of air per minute will be returned to the atmosphere. Under the conditions set forth, the work done in decompression will effectively generate about 500 megawetts per hour of electrical power. Even greater quantities of electric power may be made available for use in shorter periods of peak demand. Additionally, significant electric power generation is available from the fuel-powered generator system where the heat demand for the air expansion cycle does not require all of the available heat duty. Indeed, during periods of low peak demand, when no gas expansion is required, the fuel-powered generator may be employed simultaneously in electric power generation and in gas compression.

Where such an operation would exceed the capacity of one selected air storage reservoir, it is contemplated in this invention that additional reservoir capacity, at a convenient distance, would be joined to the selected reservoir by appropriate piping and manifolding. It is further contemplated that compressed gas may be sent to one storage reservoir while gas required for expansion may be withdrawn from a separate but associated reservoir.

We claim:

1. A process for the generation of electric power during periods of peak power demand, employing a fuel gasification facility, turbine expanders, and an associated underground air storage reservoir, comprising the steps of:

(a) compressing ambient air, by passage through at least one compressor stage, to a pressure greater than that maintained in the air storage reservoir, the compressor system of at least one compressor stage being driven at least in part by engagement with at least one turbine expander powered by a hot combustion gas mixture;

(b) cooling the compressed air to substantially ambient temperature by heat exchange serially with air and water feed streams to the fuel gasification facility;

(c) injecting the cooled, compressed air into the underground air storage reservoir through a first well system in communication therewith;

(d) withdrawing stored, compressed air from the underground air storage reservoir through a second well system, responsive at least in part to a peak power demand;

(e) commingling the withdrawn compressed air with fuel gas, from the fuel gasification facility, in a combustion zone to effect substantially complete combustion of the fuel gas;

(f) generating electric power by passing the hot combustion gas mixture through at least one turbine expander in engagement with an electric power generation means;

(g) discharging the expanded combustion gas to the atmosphere at substantially ambient temperature and pressure; and (h) delivering the generated electric power to a power supply system;

2. The process of claim 1 wherein the underground air storage reservoir comprises an aquifer storage reservoir having a caprock impermeable to gas and containing air under a superatmospheric hydrostatic pressure within the range from about 200 to about 2,500 pounds per square inch.

3. The process of claim 2 wherein the hydrostatic pressure is within the range from about 250 to about 500 pounds per square inch.

4. The process of claim 2 wherein the air storage volume of the reservoir exceeds that required to afford peak power generation without substantial modification of the superatmospheric hydrostatic pressure of the reservoir.

5. The process of claim 1 wherein ambient air is compressed in two stages, effluent air from the first stage being cooled by indirect heat exchange with air feed to the fuel gasification facility and effluent air from the second stage being cooled to substantially ambient temperature by indirect heat exchange with water feed to the fuel gasification facility.

6. The process of claim 1 wherein water is removed from the cooled, compressed air prior to its injection into the underground air storage reservoir.

7. The process of claim 5 wherein water is removed from the effluent air after each cooling step.

8. The process of claim 1 wherein the fuel employed in the fuel gasification facility is coal.

9. The process of claim 1 wherein the hot combustion gas mixture is maintained rich in air when generating electric power.

10. The process of claim 1 wherein a common turbine expander is employed sequentially in the air compression step and in the electric power generation step.

* * * * *